No. 846,669. PATENTED MAR. 12, 1907.
E. B. HOWELL.
WEIR GAGE.
APPLICATION FILED MAY 14, 1906.
2 SHEETS—SHEET 1.
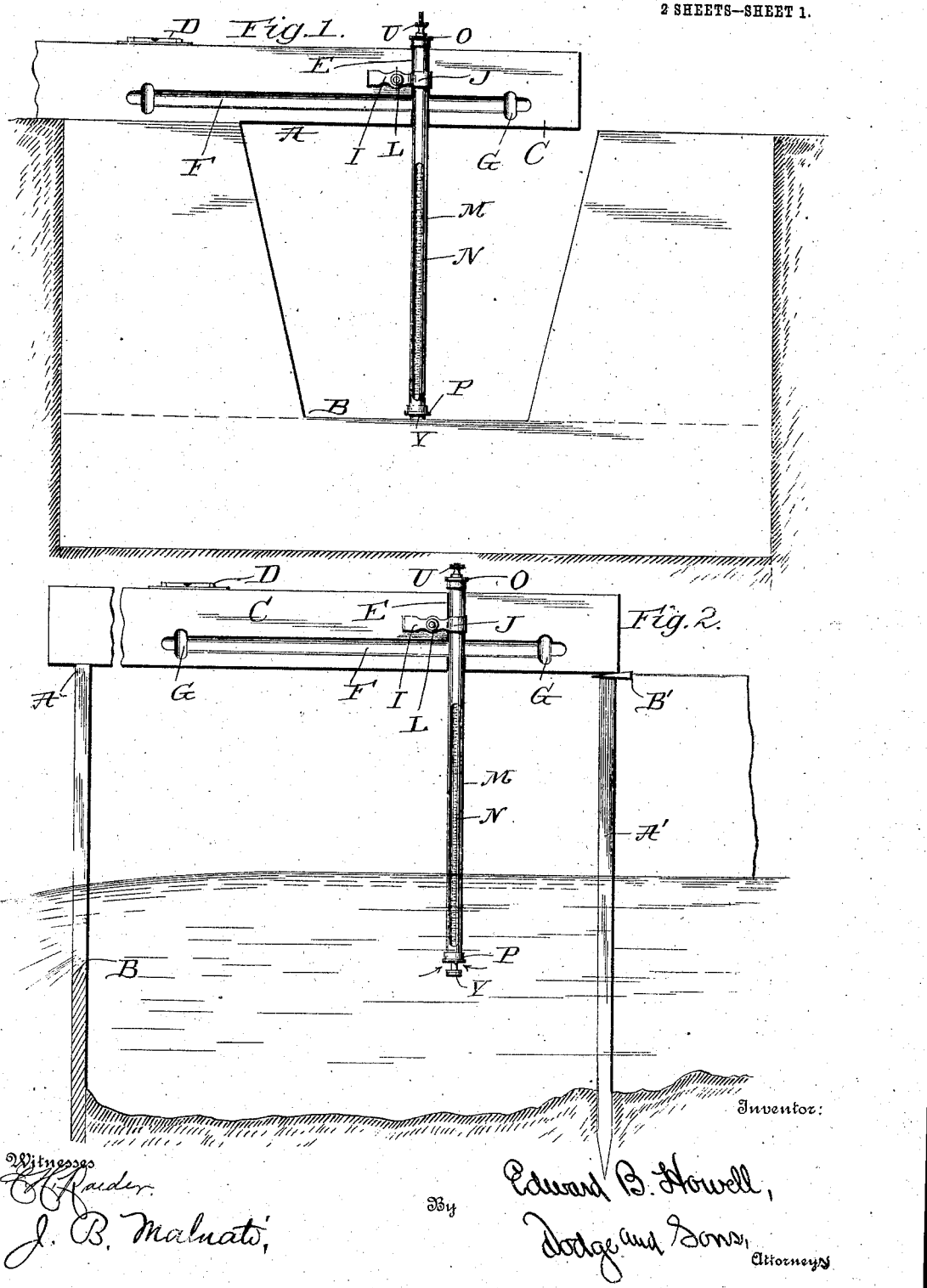

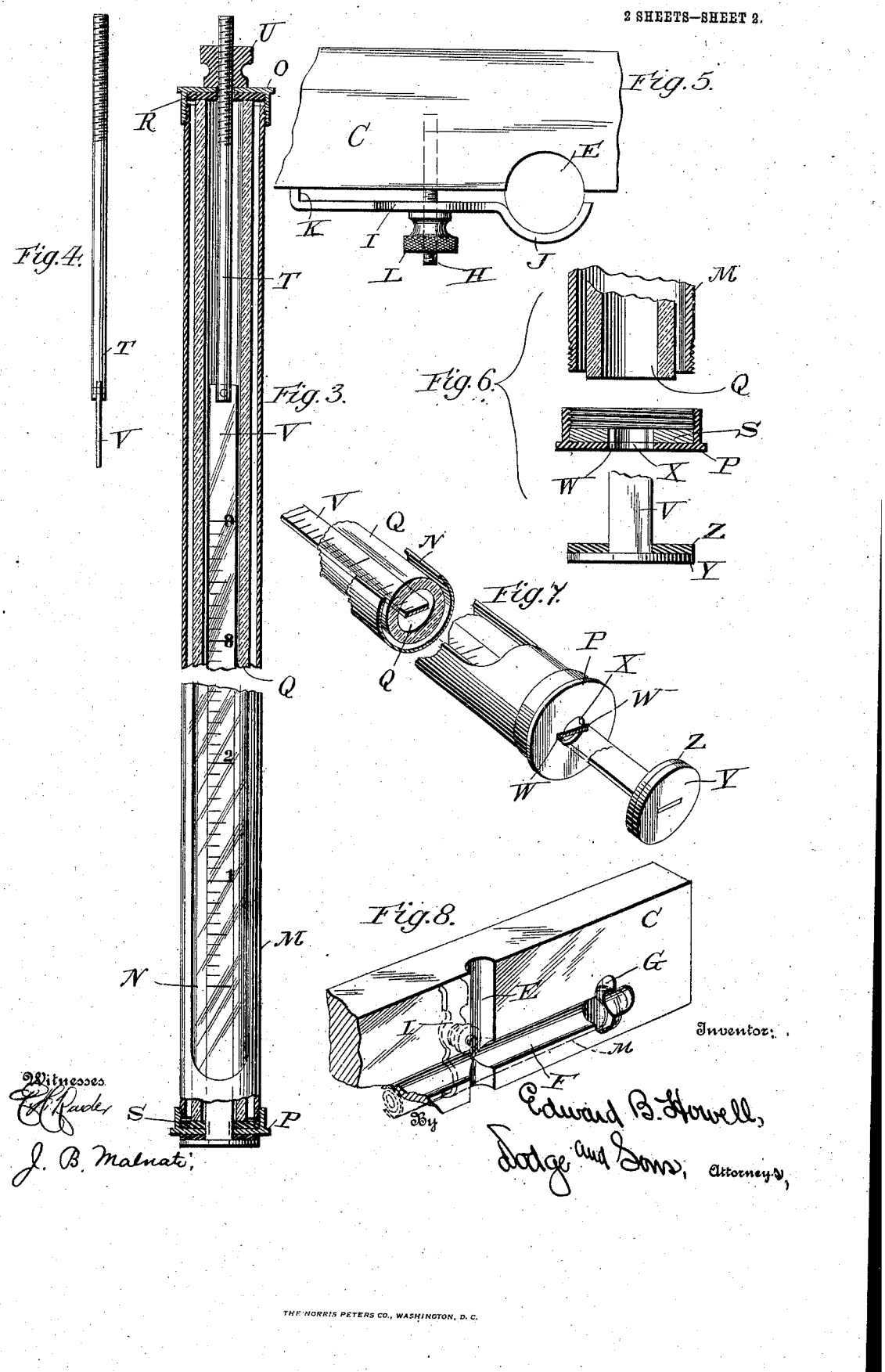

UNITED STATES PATENT OFFICE.

EDWARD B. HOWELL, OF BUTTE, MONTANA.

WEIR-GAGE.

No. 846,669.     Specification of Letters Patent.     Patented March 12, 1907.

Application filed May 14, 1906. Serial No. 316,798.

*To all whom it may concern:*

Be it known that I, EDWARD B. HOWELL, a citizen of the United States, residing at Butte, in the county of Silverbow and State of Montana, have invented certain new and useful Improvements in Gages, of which the following is a specification.

My present invention pertains to improvements in gages, and relates more particularly to gages designed for measuring the flow of water passing through a given channel or way or over a weir.

The gage is shown in the annexed drawings, wherein—

Figure 1 illustrates the instrument in its initial adjusted position in a weir; Fig. 2, a longitudinal vertical sectional view of the weir and ditch with the gage in its secondary or measuring position; Fig. 3, a sectional elevation of the gage-tube; Fig. 4, a detail view of the upper portion of the valve-actuating stem or rod; Fig. 5, a top plan view of a portion of the straight-edge or supporting-bar and the clamp employed for holding the tube; Fig. 6, a vertical sectional view of the lower portion of the gage-tube, the valve and valve-stem, the parts being separated; Fig. 7, a sectional perspective view of the same parts; and Fig. 8, a perspective view of one end of the straight-edge, illustrating the cross grooves or channels formed therein for the reception of the gage-tube.

The extended and extending use of water for irrigation purposes has rendered it desirable and, in fact, necessary for the consumer to have a ready and reliable means of accurately measuring the amount of water used; and the object of the present invention is to produce a gage which will fulfil this need. The gage shown in the drawings and hereinafter set forth in detail affords a ready and reliable means by which the flow or volume of water used may be readily determined, the construction being such that a person of average intelligence and without any special training may employ the instrument with the assurance of obtaining accurate results.

The invention in its breadth may be said to comprise a straight-edge or supporting member which when the instrument is adjusted is brought to proper position by a level (preferably secured permanently thereto) and a gage-tube adjustably mounted upon the straight-edge, the tube being provided with means whereby the exact amount of water corresponding to the quantity flowing over the weir may be impounded and measured.

Referring to the drawings, in which the gage is illustrated in Figs. 1 and 2 as being used in conjunction with a Cippoletti weir, A represents the top of the weir, and B the crest thereof, over which the water flows.

C designates the straight-edge or supporting member having preferably secured thereto a level D, though it will be understood that a separate level may be employed. The straight-edge is provided adjacent to one end with a transverse semispherical seat or recess E and with a longitudinally-disposed seat or recess F, the latter being provided with enlarged sections G to receive the enlarged portions of the gage-tube. A threaded stem H is secured to the straight-edge adjacent to the intersection of the two recesses, and a plate I, having an outwardly curved or rounded finger J and a foot-piece K at its opposite extremity, is loosely swiveled upon the stem H. The plate is held in position by a thumb-nut L, the plate serving to clamp the gage-tube in the recess E or in its operative position (see Figs. 1 and 2) or in its nested position in seat F, as shown in Fig. 8.

The gage-tube comprises an outer metallic casing M, having a longitudinally-disposed slot N formed therein, each end of the casing being threaded to receive cap-pieces O and P. A glass tube Q is arranged within the shell or casing M, and gaskets R and S are placed between the ends of the tube and the caps O and P, thus effecting a tight joint between such parts. The gaskets also serve to relieve the tube from undue strain brought about by knocks or jars to which the instrument may be subjected.

Cap O is provided with a central aperture through which is passed a threaded stem or rod T, the upper end of the rod being provided with a thumb-nut U, while its lower end is secured to the upper end of a flat plate V. Plate V upon that face which stands in line with the slot or opening N is provided with a series of graduations—say, for instance, tenths and hundredths of a foot. The lower end of the plate passes through the cap P, being guided and held against rotation by notches W, in which its edges are seated, the notches extending laterally from the circular or enlarged recess X formed in the cap.

To the lower end of plate V is secured a disk Y and an overlying washer Z, which parts, in effect, form a valve, the washer seating against the outer face of cap P and closing the recess X when the stem T and plate V, which conjointly constitute the valve-stem, are drawn up by the action of the thumb-nut U.

The operation of the device is as follows: With the valve closed and the gage-tube occupying a position in the cross-slot E, the straight-edge is placed upon the upper edge A of the weir and brought to a level or horizontal position. The lower end of the gage-tube is brought to rest upon the crest B of the weir and the clamping member or plate secured over and upon the tube, thus securing it in its adjusted position. Inasmuch as the flow of the stream is accelerated as it passes over the crest of the weir and the depth is consequently reduced at this point, (see Fig. 2,) it becomes necessary to take the measurement at a point in rear of the drop in the stream, and to this end the straight-edge is turned upstream, one end resting on the edge A, while the opposite end rests upon a stake A', standing in the ditch. If necessary, in order to secure the straight-edge in its level position, as, of course, it must be in order to secure a proper measurement, a wedge B' may be interposed between the stake and the lower face of the straight-edge. When the parts are so adjusted, the valve at the lower end of the tube having been opened, the water flows up into the gage-tube until it reaches its level. When this takes place, the valve is closed. The inlet to the tube being quite a little distance below the surface of the water in the ditch, it follows that the tube will fill to the exact extent and no more, even though the surface be churned up by the wind. The depth of water which has thus been entrapped may be read upon the plate V, and a comparison of such reading with a prearranged table will give the exact amount of water which is passing over the weir. After the measurement has been taken the user of the device will loosen the clamping-plate, remove the tube from beneath the same, and place it in the longitudinally-disposed seat or recess F, the clamping-plate being then swung around to the position shown in dotted lines in Fig. 8, with the curved portion overlying the tube, at which time the thumb-nut will be tightened and the tube thus held in place.

It is conceivable that the details of the invention may be altered without departing from the spirit thereof.

While the gage is shown in conjunction with a Cippoletti weir, it is to be understood that it may be used equally as well with a rectangular weir.

From the foregoing description it will be noted that it is not necessary for the user of the gage to place his hand beneath the surface of the water either in the act of opening or closing the valve. The construction also avoids any possibility of the level of the instrument being destroyed after it has once been positioned, inasmuch as it is not necessary to place the hand beneath the water and reach down to open or close a valve after the water has passed into the gage-tube.

Having thus described my invention, what I claim is—

1. In an instrument for gaging liquid at weir-notches, the combination of a straight-edge; a gage-tube adjustably secured to said member at substantially right angles to the longitudinal axis thereof; and a valve for opening and closing said tube.

2. In an instrument for gaging liquid at weir-notches, the combination of a straight-edge; a transparent gage-tube adjustably secured thereto; a valve for opening and closing said tube; and a scale, located in operative relation with the tube.

3. In an instrument of the character specified, the combination of a straight-edge; a transparent tube adjustably secured thereto; a valve located at the lower end of the tube; a graduated valve-stem connected to the valve and extending through the tube; and means for actuating said stem to open and close the valve.

4. In an instrument of the character specified, the combination of a straight-edge; and a gage secured thereto, said gage comprising a shell or casing provided with a sight-opening or slot in its face, a glass tube mounted within the shell, means for effecting a tight joint between the ends of the tube and the shell, a valve located at the lower end of the shell and arranged to close an opening formed therein leading into the tube, a valve-stem provided with graduations upon that face which stands in line with the opening formed in the shell, means for preventing rotation of the stem, and means to move the stem endwise to open and close the valve.

5. In an instrument of the character specified, the combination of a straight-edge; and a gage adjustably secured thereto, said gage comprising a metallic shell or casing provided with a longitudinally-disposed sight-opening, a glass tube mounted within the casing, a cap-piece secured upon each end of the shell, a gasket interposed between each cap-piece and the adjacent end of the tube, a valve located beneath the lower cap-piece and arranged to close a relatively large opening formed therein, a flat, graduated valve-stem secured to the valve and projecting into notches extending outwardly from the opening in the lower cap-piece, and means for raising and lowering the stem.

6. In an instrument of the character specified, the combination of a straight-edge provided with a seat or recess extending across the same and with a second recess longitudinally disposed; a clamp arranged adjacent to said recesses; and a gage-tube arranged to be held by the clamp in one or the other recess.

7. In an instrument of the character specified, the combination of a straight-edge provided with two recesses intersecting each other at substantially right angles; a gage-tube adapted to be seated in one or the other of said recesses; and a clamp located adjacent to the point of intersection of the recesses, whereby said clamp may be employed to hold the tube in either recess, substantially as described.

8. In an instrument of the character specified, the combination of a straight-edge; a transparent tube adjustably secured thereto; a valve located at the lower end of the tube; a valve-stem connected to the valve and extending upwardly through the tube; and a thumb-screw secured upon the upper threaded end of the stem, whereby the valve may be opened and closed when the gage is in the water without the necessity of the user placing his hand in the water, substantially as described.

In testimony whereof I have signed my name to this specification in the presence of two subscribing witnesses.

EDWARD B. HOWELL.

Witnesses:
 W. F. DAVIS,
 K. T. BRESLIN.